United States Patent [19]

Breda et al.

[11] Patent Number: 4,860,421
[45] Date of Patent: Aug. 29, 1989

[54] METHOD FOR ASSEMBLING PLATE TYPE HEAT EXCHANGERS

[75] Inventors: Michael A. Breda, E. Amherst; George K. Snyder, Lockport, both of N.Y.

[73] Assignee: General Motors Corporation, Detroit, Mich.

[21] Appl. No.: 314,860

[22] Filed: Feb. 23, 1989

[51] Int. Cl.⁴ .............................................. B21D 53/02
[52] U.S. Cl. ............................ 29/157.3 A; 29/157.3 B; 29/157.3 D; 29/430; 29/464
[58] Field of Search ................... 29/157.3 A, 157.3 D, 29/157.3 B, 157.3 C, 157.3 R, 429, 430, 462, 463, 464, 467, 33 G, 726; 165/170

[56] References Cited

U.S. PATENT DOCUMENTS

| | | | |
|---|---|---|---|
| 4,554,719 | 11/1985 | Lewis | 29/157.3 D |
| 4,592,414 | 6/1986 | Beasley | 29/157.3 D |
| 4,600,053 | 7/1986 | Patel et al. | 29/157.3 D |
| 4,688,631 | 8/1987 | Peze et al. | 29/157.3 D |

Primary Examiner—Howard N. Goldberg
Assistant Examiner—Irene Cuda
Attorney, Agent, or Firm—Ronald L. Phillips

[57] ABSTRACT

Pairs of standard plates and special plates are assembled and inserted into a fixture along with side plates and intervening fins at respective assembly stations along a conveyor in accordance with a programmed order of insertion. The fixture separates elements already in place by a variable amount as needed to accommodate the insertion of each additional element. The insertion of fins is coordinated with the manufacture of the fins for direct insertion upon formation.

5 Claims, 4 Drawing Sheets

METHOD FOR ASSEMBLING PLATE TYPE HEAT EXCHANGERS

FIELD OF THE INVENTION

This invention relates to a method of assembling heat exchangers and particularly to an automated method of making plate type heat exchangers.

BACKGROUND OF THE INVENTION

Heat exchangers of the plate type are comprised of pairs of preformed plates joined to other pairs at their ends by integral bosses and separated at their middle section by air centers or corrugated fins, the plates and fins all being brazed together so that each pair of plates becomes a tube for carrying refrigerant, the bosses serving as a manifold for permitting refrigerant flow from one tube to another, and the fins facilitating heat exchange between the tubes and air flowing outside the tubes.

FIGS. 1, 2, and 3 depict such a heat exchanger. The plates 10 are mainly of a standard type having bosses or cups 12 and 14 on either end with apertures 16 communicating with adjacent cups to permit fluid flow therebetween. The boss 14 on one end is provided with a flange 18 around the aperture which nests in the aperture 12 of an adjacent plate. In some cases, to establish a particular flow pattern, a special plate having a blind boss 20, i.e. a boss with no aperture, is used instead of a flanged boss 14. Depending on the plate orientation the blind boss may be on either end. Moreover, each special plate is mated with a standard plate and either plate may be upstream depending on the orientation. Another type of special plate is the outside plate 22 on each side. The outside plate is bounded by a side plate 26 and a low center or fin 28 sandwiched between the outside plate 22 and the side plate 26. The low center 28 is half the thickness of the standard centers 30 which reside between the plate pairs. The special outside plate 22 has bosses with no flanges which are brazed directly to the side plate. U.S. Pat. No. 4,470,455 issued to Sacca describes such a plate type heat exchanger in detail.

The assembly of the plate type heat exchanger elements into a core ready for brazing has typically been carried out largely by hand operations. Specifically, the first step in the previous process is to assemble a fin element between two plates and form subassemblies by crimping the plates together where their bosses connect, and then manually stack such subassemblies along with side plates into a fixture which holds each subassembly in place.

It is desirable to enhance the assembly method to improve the efficiency of the assembly practice. In particular it has been found that the process is improved in terms of automation if it comprises joining the plates together into pairs that eventually become tubes, inserting the plate pairs and side plates into a fixture and then inserting the centers between the plates. It has been demonstrated that the automated assembly of plate pairs, air centers and side plates into fixtures is practical.

It is known to automatically assemble other styles of heat exchanger core as shown in the U.S. Pat. No. 4,321,739 to Martin et al. In Martin et al the tubes are first inserted into blocks carried by chains and the centers are then loaded between the tubes which are well spaced by the blocks. The tubes and centers are gathered together as the blocks are removed from one tube at a time. Thus tubes and centers are arranged in alternate rows and headers are joined to the ends of the tubes and tanks are joined to the headers to couple the tubes together. The tubes do not directly coact and they have smooth exteriors which facilitate the insertion of centers, as contrasted with the plate and center type which requires that the plates each mate with their neighbors as well as to sandwich the air centers. Further, the plate edges protrude in a way to interfere with center insertion so that large spacings between the plates would be required to permit center insertion. The large spacings necessitate a large gathering distance and also allow centers to get out of position so that centers can interfere with the coupling of the plates during the gathering process.

SUMMARY OF THE INVENTION

It is therefore an object of the invention to provide a method of assembling plate type heat exchanger cores.

The invention is carried out by the method of assembling heat exchangers having tubes comprised of pairs of formed plates with the tubes laterally coupled at their ends and fins sandwiched between the tubes, comprising the steps of; mating pairs of plates together to form plate pairs, dropping each plate pair into a fixture at a distance from any plate pair already in the fixture to facilitate insertion, moving adjacent plate pairs together to couple the ends of adjacent plate pairs while dropping additional plate pairs into the fixture, separating plate pairs from adjacent pairs to receive fin elements, forming fin elements for insertion between the plate pairs and immediately inserting each fin element into the fixture between separated plates, and moving adjacent plate pairs together into engagement with intervening fin elements.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 4:
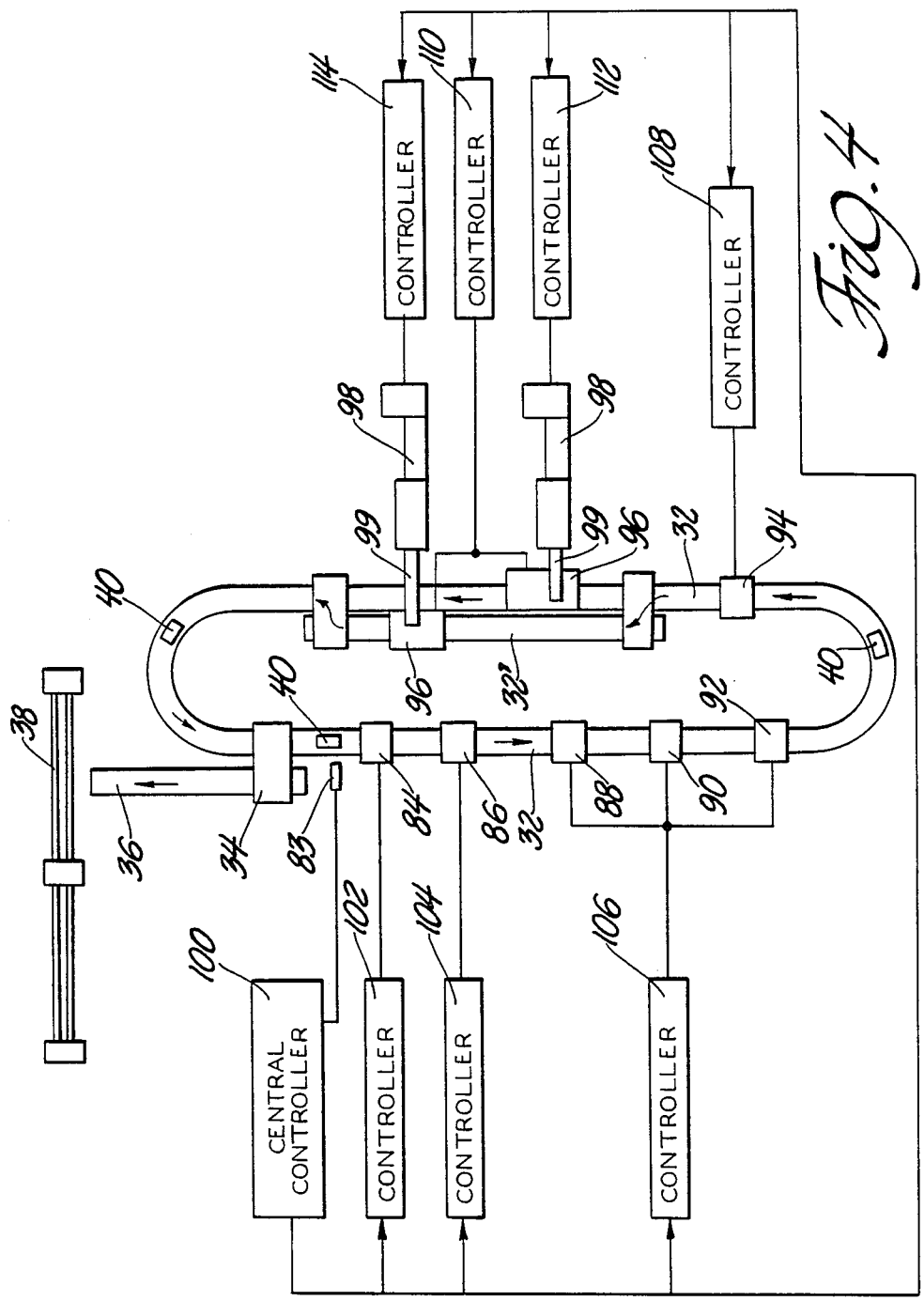
FIG. 4 is a schematic plan view of a conveyor and associated assembly equipment for carrying out the method of the invention.

FIG. 4 shows a plan view of an assembly system having a power and free conveyor 32 following a generally oval path which includes several assembly stations where the heat exchanger core is built in a fixture, a transfer station 34 where the assembled core is transferred to a banding conveyor 36 for the purpose of adding brazing fixtures and banding the assembly, and a load station 38 for delivering the core elements to a braze oven (not shown). The conveyor 32 carries pallets or fixtures 40 from one assembly station to the next where various elements are inserted into the pallets according to a programmed sequence. The movement of each pallet 40 through stations 84, 86, 94 and 96 is controlled by special advancement mechanisms rather than by the conveyor 32 as described in detail later.

Figure 5:
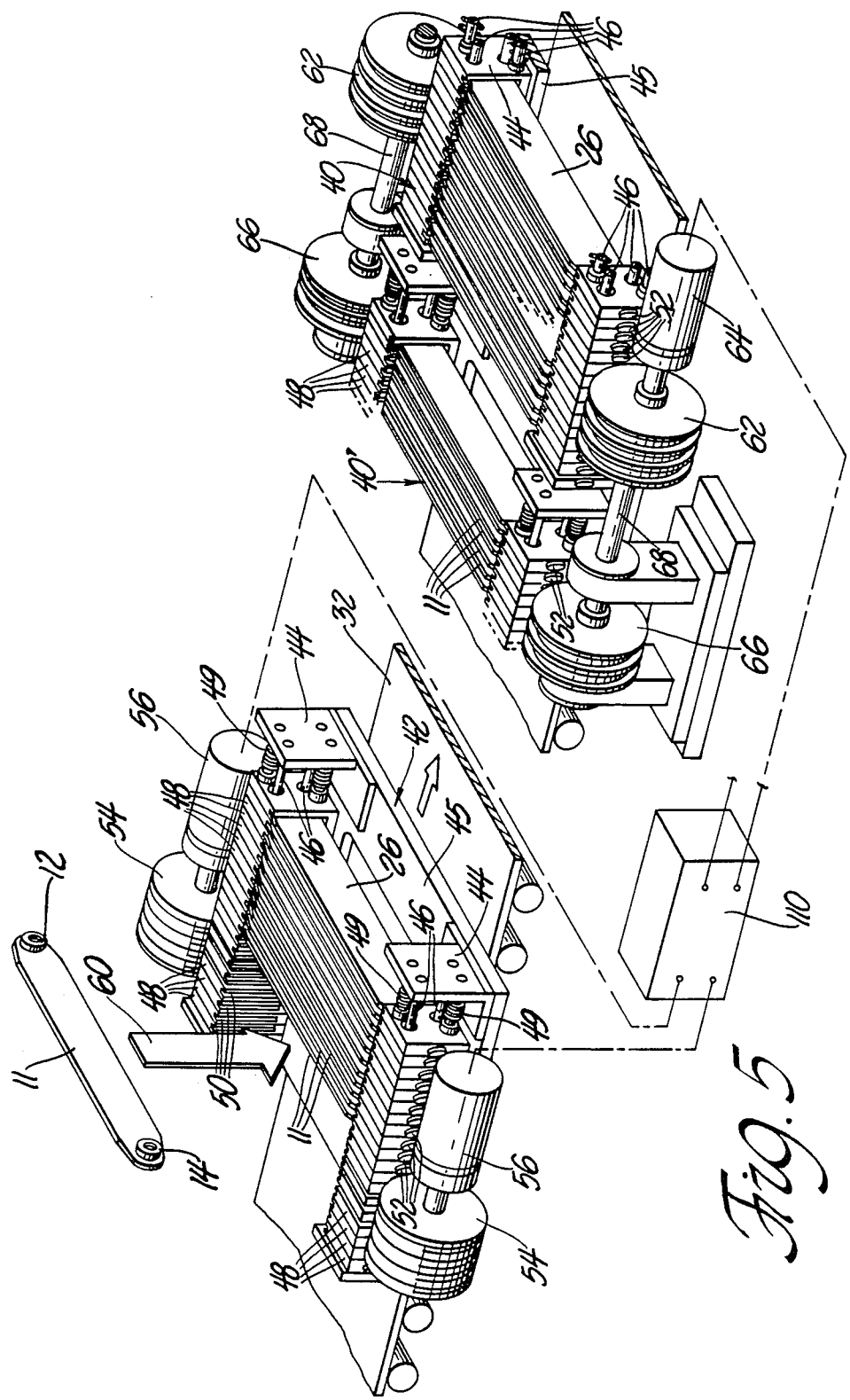
FIG. 5 is an isometric view of a pallet system used for carrying out the method of the invention.

A pallet 40 and special advancement mechanism is shown in FIG. 5. Our copending U.S. patent application Ser. Nos. 07/328847 and 07/329170 reveal additional details of the pallet system and are incorporated herein by reference. A pallet 40 comprises an open-sided frame 42 with vertical end plates 44 at each corner of a horizontal base plate 45. Four rods 46 supported by the end plates 44 extend longitudinally along each side to pass through and hold a plurality of perforated blocks 48 which can slide a limited amount along the rods. A coil spring 49 under compression surrounds a rod 46 on each side between an end plate 44 and the nearest block 48 to hold the blocks together against the other end of the frame unless the spring force is overcome. The blocks 48 each have a slot 50 for receiving the edges of a plate pair 11 adjacent their cups 12 and 14. Each block also has an outboard cam follower 52 extending to the side of the pallet. A lead screw 54 with its axis parallel to the rods 46 at each side of the path of the pallet engages just a few of the cam followers 52 at a given time. The lead screws 54 are synchronously rotated by servomotors 56 to advance the corresponding blocks 48 longitudinally so as to precisely position the blocks and to advance the entire pallet 40 as well. A microprocessor based controller 110 controls the servomotors 56. The lead screws are positioned at a loading station for pairs 11 of plates and the pallets 40 are carried to the loading station by the power and free conveyor 32 which depends on a frictional contact to rive the pallet. The lead screws engage the cam followers of the blocks and positively and precisely position the blocks at a feed plane where plate pairs are dropped into the slots 50 in the blocks 48. As shown in FIG. 5 the first few blocks are holding plate pairs 11 and subsequent blocks are prepared to receive a plate pair being inserted as indicated by an arrow 60.

Figure 1:
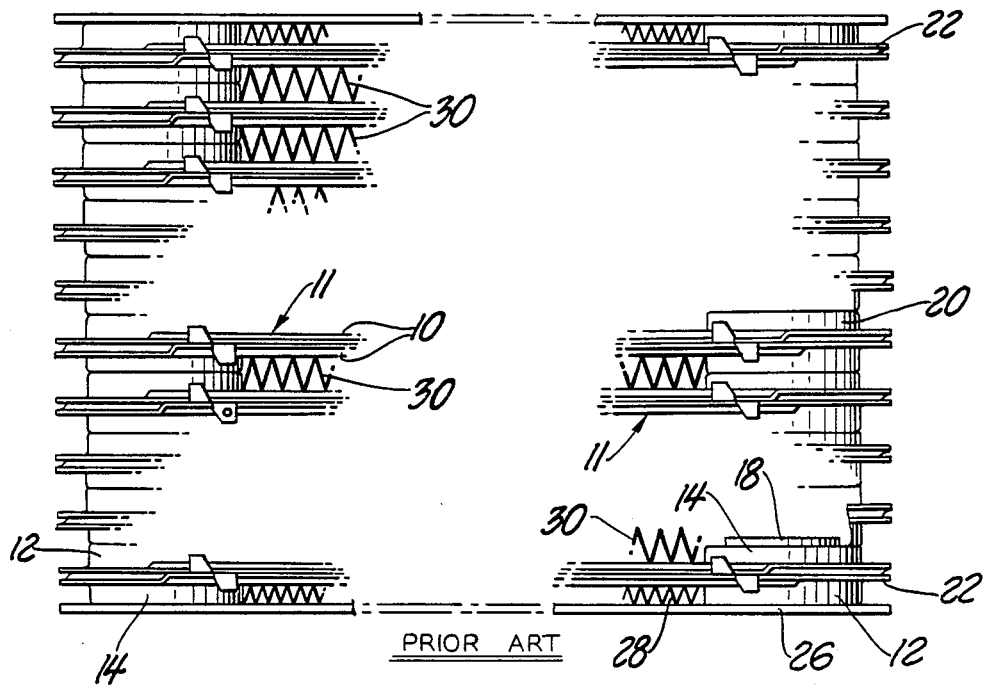
FIG. 1 is an elevation of a heat exchanger to be assembled according to the invention, the heat exchanger being a prior art device and forming no part of the invention.
Figure 2:
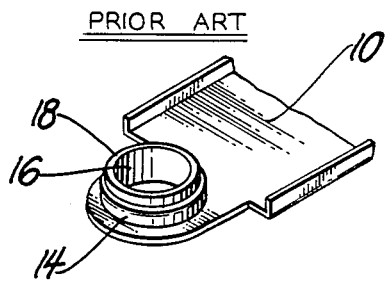
FIGS. 2 and 3 are partial perspective views of two different plate ends used in the heat exchanger of FIG. 1.
Figure 3:
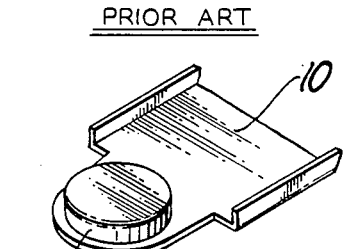

The width of the blocks is such that when they are nested together the adjacent plate pairs 11 are stacked together as shown in FIG. 1. A critical function of the pallet system is that the pitch of the lead screw 54 is greater than the width of the blocks so that the few blocks that are actively engaged by the lead screws are spaced far enough to permit insertion of the plate pairs 11 without interference by an adjacent plate pair and the adjacent pairs are moved into a nested assembly as they are released by the lead screws. The conveyor 32 carries the pallet from one station to the next. At any plate feeding station equipped with lead screws, the blocks 48 are spaced apart as they pass the feeding plane and the proper plate pairs are inserted into empty slots according to plate pairs are inserted into empty slots according to a preset program.

Figure 6:
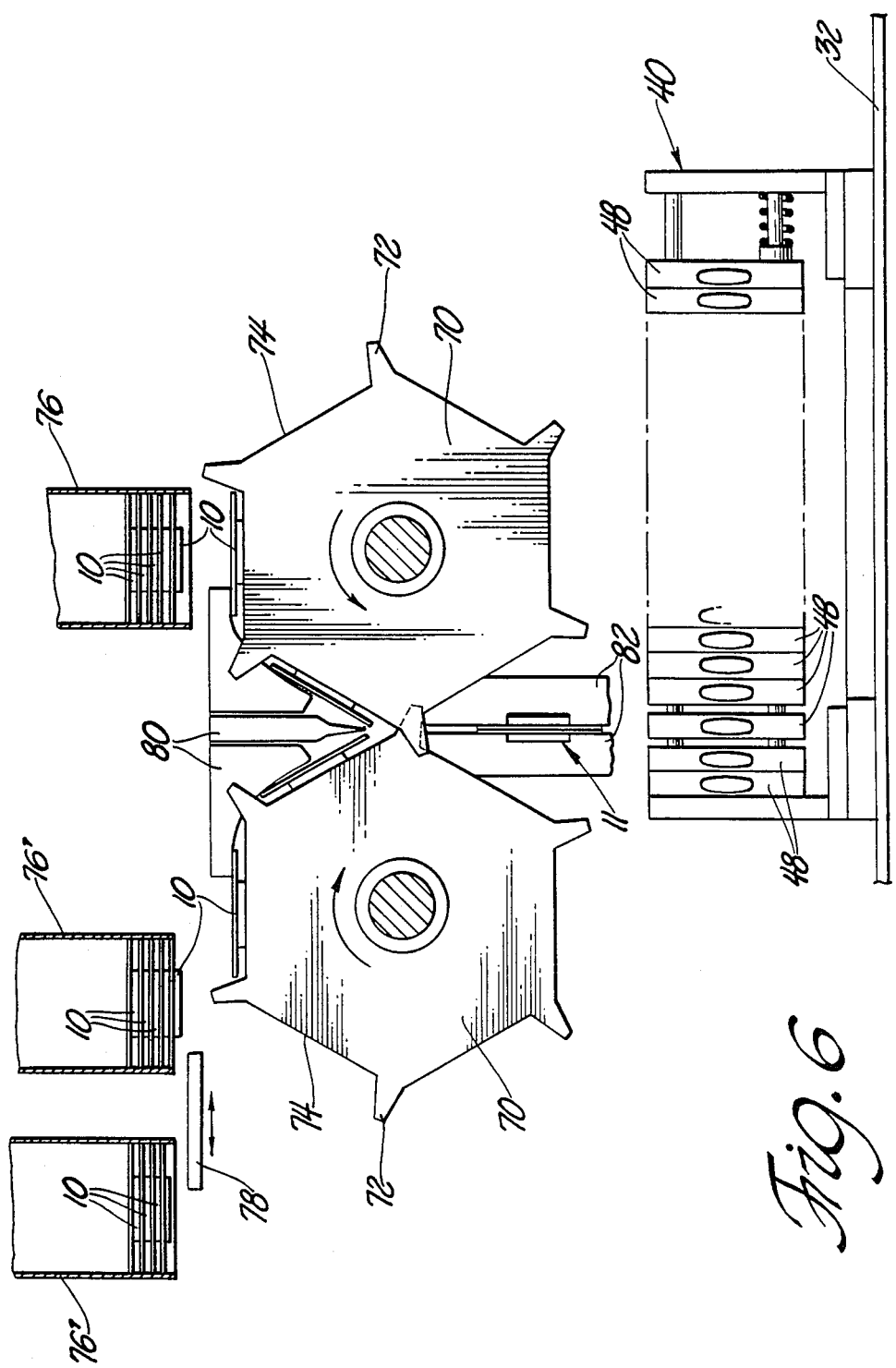
FIG. 6 is a plan view of a plate pair assembly machine used for carrying out the method of the invention.

Plates 10 are assembled into pairs 11 by a machine shown schematically in FIG. 6. Two counter-rotating rotors 70, each tangent to a vertical plane, have six flats or pockets 74 for receiving plates 10. Fingers 72 at the trailing edge of each pocket positively drive the plates upon rotor rotation. Plates 10 are loaded from magazines or other supply means above the rotors. For special plate pairs, the plates are held in magazines 76, 76'. Each special plate pair 11 has a standard plate 10 mated with a special plate. One magazine 76 directly above a rotor 70 contains the standard plates and drops the plates one by one into the pockets of the rotor. Two or more other magazines 76', loaded with different species of special plates, feed the other rotor via a cart or shuttle 78 which selectively removes plates from a magazine and transfers it to the corresponding rotor. Thus each standard plate can be married to one of several special plates. In the case of standard plate pairs 11, a single magazine 76 above each rotor stores standard plates and no cart 78 is needed.

Guides 80 engage the plate ends as the rotors carry the plates toward the vertical mating plane to assure proper plate positioning. The plates are thus precisely brought together to form a pair 11 which is dropped through vertical guides 82 to a block 48 which has been positioned by a pallet 40. With this arrangement the standard plates will all be on the upstream side or on the downstream side of the plate pair 11. A second equivalent machine will be used to assemble plates in the other orientation. Our copending U.S. patent application Ser. No. 314,002 filed 2-32-89 reveals additional details of the plate pair assembly operation and is incorporated herein by reference.

Centers 30 are supplied to the pallet in the same manner as the plate pairs but are inserted between the plate pairs 11. Center 30 insertion occurs after all the plates are inserted since the plates 10 position and laterally support the centers. A center loading station is shown in FIG. 5 downstream from the plate loading station. Lead screws 62 driven by servomotors 64 are on opposite sides of the conveyor 32 and engage the cam followers 52 on the blocks 48 whose optimum spacing for center insertion is less than for the plate pair insertion. Thus the lead screws 62 at the center loading station have a smaller pitch than those at the plate pair loading station. Accordingly, the pallet 40 can provide various insertion spacings under control of the lead screws at a various stations.

A special feature at the center loading station is an auxiliary lead screw 66 drivingly coupled to each lead screw 62 by a shaft 68 but spaced from the lead screws 62 by a distance of perhaps one half the length of a pallet 40. The purpose of the lead auxiliary screw 66 is to engage a pallet 40' which is waiting to enter the center loading station and positively advance the pallet at a rate determined by the motor 64 speed. In the absence of the lead screw 66 the pallet would be advanced by the power and free conveyor 32 which relies on friction to move the pallet and is accordingly limited in its ability to accelerate the pallet. The positive advancement is most advantageous when the waiting pallet is touching or nearly touching the pallet in the station. By positively advancing the waiting pallet 40' it can be accelerated quickly for positioning in the station under control of the lead screw 62, thus minimizing the time lapse between the last center insertion in one pallet 40 and the first center insertion in the next pallet 40'. The benefit of minimizing the time lapse is to allow the supply of centers to proceed at a more uniform rate. In the most efficient arrangement the centers are fed to the pallet directly from the machines 98 making the centers as shown in FIG. 4. These machines operate best at a constant output rate but they can vary their rate somewhat to accommodate the time lapse between pallets, providing that the time lapse is small. In other words, it is not desirable to stop the supply of centers each time a pallet is positioned in the loading station but some slow down is permissible. The positive advancement of the waiting pallet by the lead screw 66 in conjunction with the control by lead screw 62 permits its precise positioning in the loading station in the minimum time.

Referring to FIG. 4, the assembly process starts at a first station having an encoder 83 for assigning a machine readable model identification code to an empty pallet 40. The subsequent stations have code readers for learning the model being built on that pallet. The pallet is conveyed to station 84 and then to station 86 which are equipped with pair plate assembly apparatus like that of FIG. 6 and with lead screws 54. One station assembles and inserts into the pallet special plate pairs with blind bosses 20 and outside plate pairs 22 on the upstream side and the other station handles similar plate pairs with the special plates on the downstream side. This division of workload reduces the complexity of each station since only one cart 78 is needed to load the special plates. If desired, the stations 84 and 86 could be consolidated by using one or more carts 78 and several magazines 76 to feed each rotor. The pallet is next conveyed to stations 88 and 90 for the insertion of side plates 26 in the first and last active blocks respectively. Lead screws are not necessary at these stations because the pallets can be positioned by stops and block separation is not necessary. The stops can be movably mounted on slides under programmed control to accommodate various positions of the side plates in the fixture as dictated by the size of the core being assembled. The side plates are inserted by pick and place devices. Then the pallet is moved to station 92 where low centers 28 are inserted between the side plates 26 and the corresponding outside plate pair 22. Here the lead screws are not necessary because the thin side plate held in a block 48 leaves adequate room to allow the insertion of the centers. At this point all the relatively low volume elements have been loaded into the pallet and the high volume standard plate pairs 11 and centers 30 are yet to be installed.

The pallet is moved to station 94 for the insertion of standard plate pairs by a machine like that shown in FIG. 6 except that both rotors are fed by magazines 76 and no carts are needed. The lead screw pallet drive of FIG. 5 is used to separate the blocks 48 and to accurately position the blocks with respect to the plate pair drop. After the station 94 the conveyor splits into parallel paths to provide a second pallet path 32' and both paths go to respective center feeder stations 96 equipped with the dual lead screw apparatus of FIG. 5. The center machines 98 adjacent the stations 96 continuously produce centers 30, feed them through chutes 99 and drop them into spaces between plate pairs 11 as fast as they are produced. When a pallet is nearly full, the controller for the center feed station 96 tells the center machine to run slowly (20 parts per minute) as the center feed indexer transitions from a filled pallet to a new pallet. Once the new pallet is in place the center machine 98 ramps to full speed (90 parts per minute). The conveyor flow blends back together downstream of the center feeds. At the transfer station 34 the core is lifted out of the pallet and transferred to the banding conveyor 36. The pallet is recycled through the various stations to repeat its assembly function.

It will thus be seen that in each station except for the side plate and low center insertion stations and the transfer station 34, the blocks are spread apart by a lead screw, the element is inserted and the blocks are closed to mesh the elements with their neighbors. The elements are inserted into programmed positions according to the core model being built. The system has the flexibility to build a mixture of models due to a control system which is responsive to the designated model identification on each pallet.

The assembly operations are coordinated by a two tier control comprising a central controller 100 having supervisory direction over several local controllers 102-114. The central controller also assigns the model code to each pallet via the encoder 83. Essentially, each local controller is sensitive to the model code of the pallet or pallets at its station or stations and is effective to control the insertion of the elements in the correct blocks 48 of each pallet by positioning the pallet at the proper loading locations and timing the insertion of the required element. Thus, local controllers 102 and 104 control stations 84 and 86, respectively, to direct the insertion of the special plates pairs 11 in the correct blocks 48 in response to the model code. In the case of special plate pairs the code also determines the action of the cart 78 to select the correct special plate from a magazine 76'. Controller 106 serves stations 88, 90 and 92 for the installation of side plates and low centers. Controller 108 manages the plate pair feeder station 94 and controller 110 controls both center feeders 96. Controllers 112 and 114 control each of the center machines 98 and coordinates the center dropping with pallet position as well as the center machine speed during transition between pallets.

The embodiments of the invention in which an exclusive property or privilege is claimed are defined as follows:

1. The method of assembling heat exchangers having tubes comprised of pairs of formed plates with the tubes laterally coupled at their ends and fins sandwiched between the tubes, comprising the steps of;
   mating pairs of plates together to form plate pairs,
   dropping each plate pair into a fixture at a distance from any plate pair already in the fixture to facilitate insertion,
   moving adjacent plate pairs together to couple the ends of adjacent plate pairs while dropping additional plate pairs into the fixture,
   separating plate pairs from adjacent pairs to receive fin elements,
   forming fin elements for insertion between the plate pairs and immediately inserting each fin element into the fixture between separated plates, and
   moving adjacent plate pairs together into engagement with intervening fin elements.

2. The invention as defined in claim 1 wherein the fin elements are formed and inserted at a set rate and the fixtures are indexed at the same rate to synchronize advancement of plate pairs with fin manufacture, and
   slowing the fin formation rate when a fixture is full to allow transition to another fixture for continued fin insertion, whereby the formation of fin elements is a continuous process harmonized with the assembly process.

3. The method of assembling a heat exchanger having tubes comprised of pairs of formed plates with the tubes selectively laterally coupled at their ends and fins sandwiched between the tubes, the plate pairs and resulting tubes being of different species to form desired flow paths by strategic placement in the assembly, comprising the steps of;
   for each tube species, mating pairs of plates together to form plate pairs by advancing each plate toward the other and into a vertical assembly plane, advancing a fixture through each vertical assembly plane and increasing the spacing of any adjacent plate pairs in the fixture as they pass through an assembly plane to facilitate insertion of a plate pair, dropping each plate pair into the fixture according to a programmed arrangement of tube species, moving adjacent plate pairs together to couple the ends of adjacent plate pairs while dropping additional plate pairs into the fixture, forming fin elements for insertion between the plate pairs, separating plate pairs from adjacent pairs to receive fin elements, inserting each fin element as soon as it is formed into the fixture between separated plates, and moving adjacent plate pairs together into engagement with intervening fin elements.

4. The invention as defined in claim 3 wherein the plate pairs include standard plate pairs and outside plate pairs, and the heat exchanger further has side plates and special fins between the side plates and the outside plate pairs, including the steps of:

inserting the side plates and the outside plate pairs into the fixture, and then inserting special fins between the side plates and the outside plate pairs prior to dropping standard plate pairs into the fixture.

5. The invention as defined in claim 3 including lifting the assembled set of plates and fins from the fixture and banding the set for a brazing operation.

* * * * *